United States Patent [19]

Sakamoto et al.

[11] Patent Number: 4,843,704
[45] Date of Patent: Jul. 4, 1989

[54] TOOL EXCHANGE APPARATUS

[75] Inventors: Katsuyoshi Sakamoto; Takeshi Takahashi, both of Isehara, Japan

[73] Assignee: Amada Company, Limited, Japan

[21] Appl. No.: 95,233

[22] Filed: Sep. 11, 1987

[30] Foreign Application Priority Data

Sep. 11, 1986 [JP] Japan .................. 61-212723
Sep. 11, 1986 [JP] Japan .................. 61-212724

[51] Int. Cl.⁴ .......................................... B23Q 3/155
[52] U.S. Cl. .......................................... 29/568; 72/446; 83/559
[58] Field of Search .................. 29/568; 83/550, 551, 83/559; 72/446, 448

[56] References Cited

U.S. PATENT DOCUMENTS

| | | | |
|---|---|---|---|
| 3,745,646 | 7/1973 | Kristiansson | 29/568 |
| 3,765,291 | 10/1973 | Stenfeldt | 29/568 |
| 3,822,466 | 7/1974 | Noguchi et al. | 29/568 |
| 4,575,918 | 3/1986 | Mattson . | |
| 4,642,875 | 2/1987 | Rutschle et al. | 29/568 |
| 4,649,622 | 3/1987 | Scott | 29/568 |
| 4,669,174 | 6/1987 | Fischer et al. | 29/568 |
| 4,696,091 | 9/1987 | Kitamura | 29/568 |

FOREIGN PATENT DOCUMENTS 1322104 7/1973 United Kingdom .
1431738 4/1976 United Kingdom .
1573784 8/1980 United Kingdom .

Primary Examiner—Gil Weidenfeld
Assistant Examiner—Daniel W. Howell
Attorney, Agent, or Firm—Wigman & Cohen

[57] ABSTRACT

A tool exchange apparatus comprises a first tool exchange arm for removing a previous tool mounted on a machine tool and returning the removed previous tool on a tool magazine and a second tool exchange arm for removing a new tool arranged on a tool magazine and setting the removed new tool to the machine tool, so that tool exchange operation can be achieved continuously. Further, each tool exchange arm comprises an upper finger and a lower finger. The upper finger is movable relative to the lower finger in order to remove only a lower tool (e.g. die) without exchanging an upper tool (e.g. punch).

5 Claims, 9 Drawing Sheets

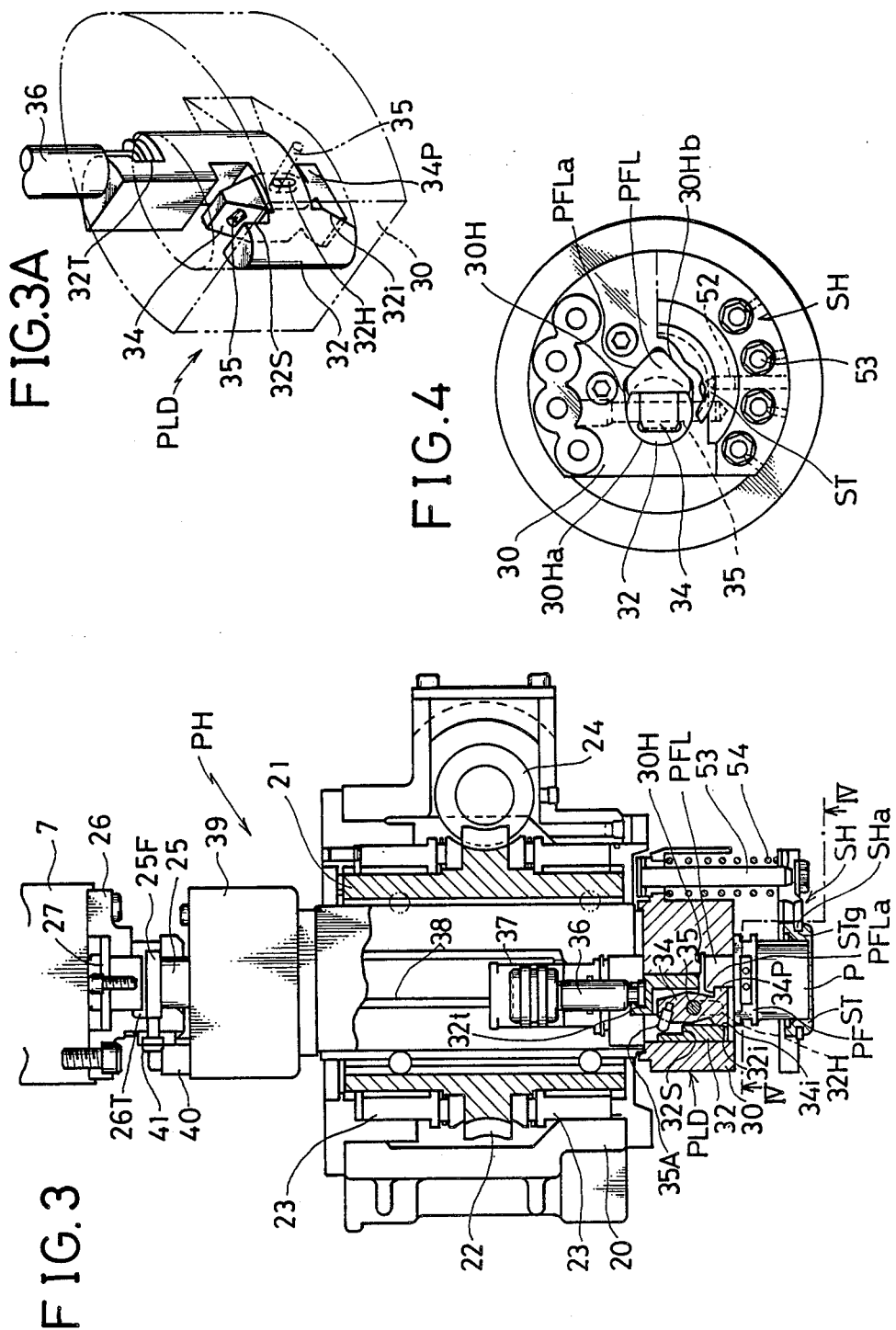

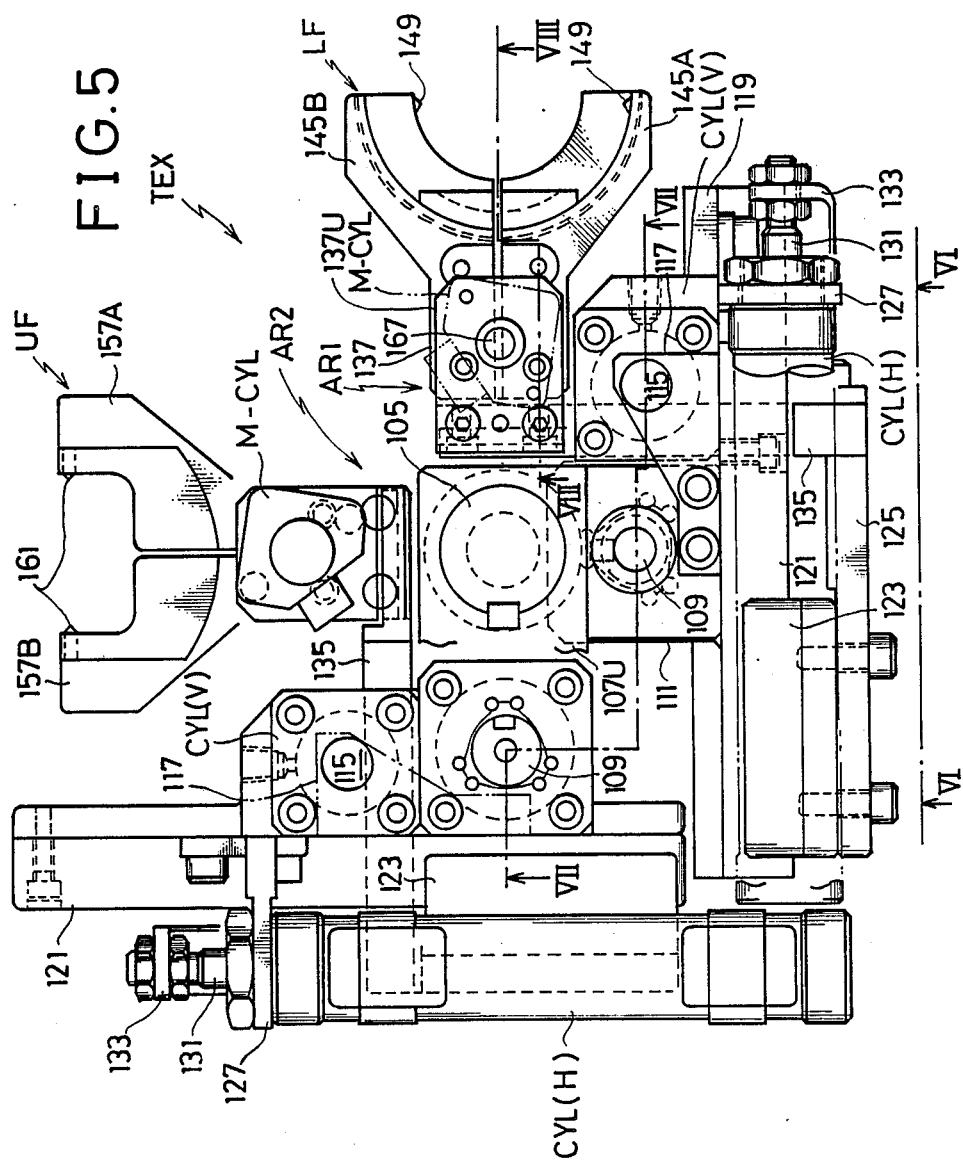

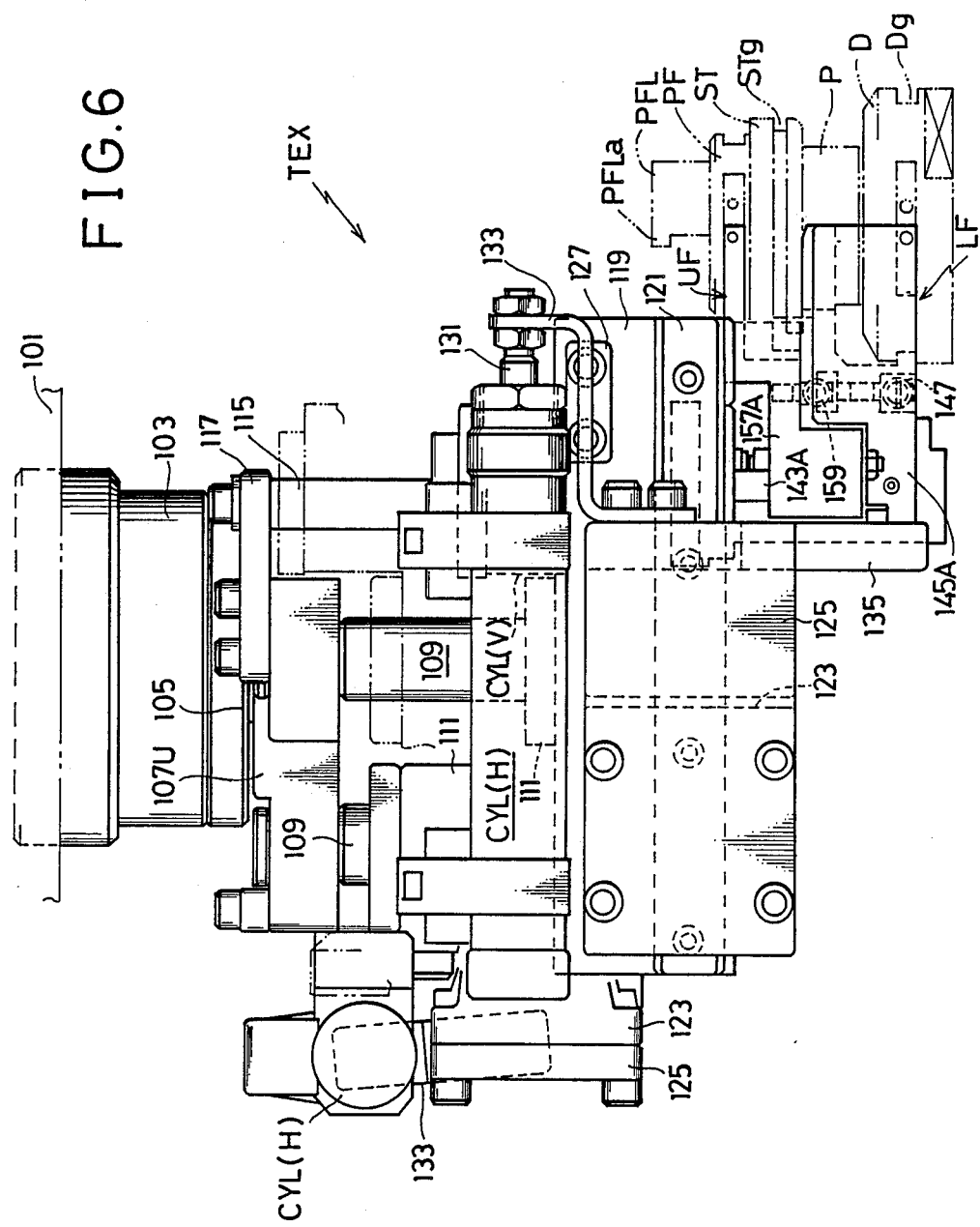

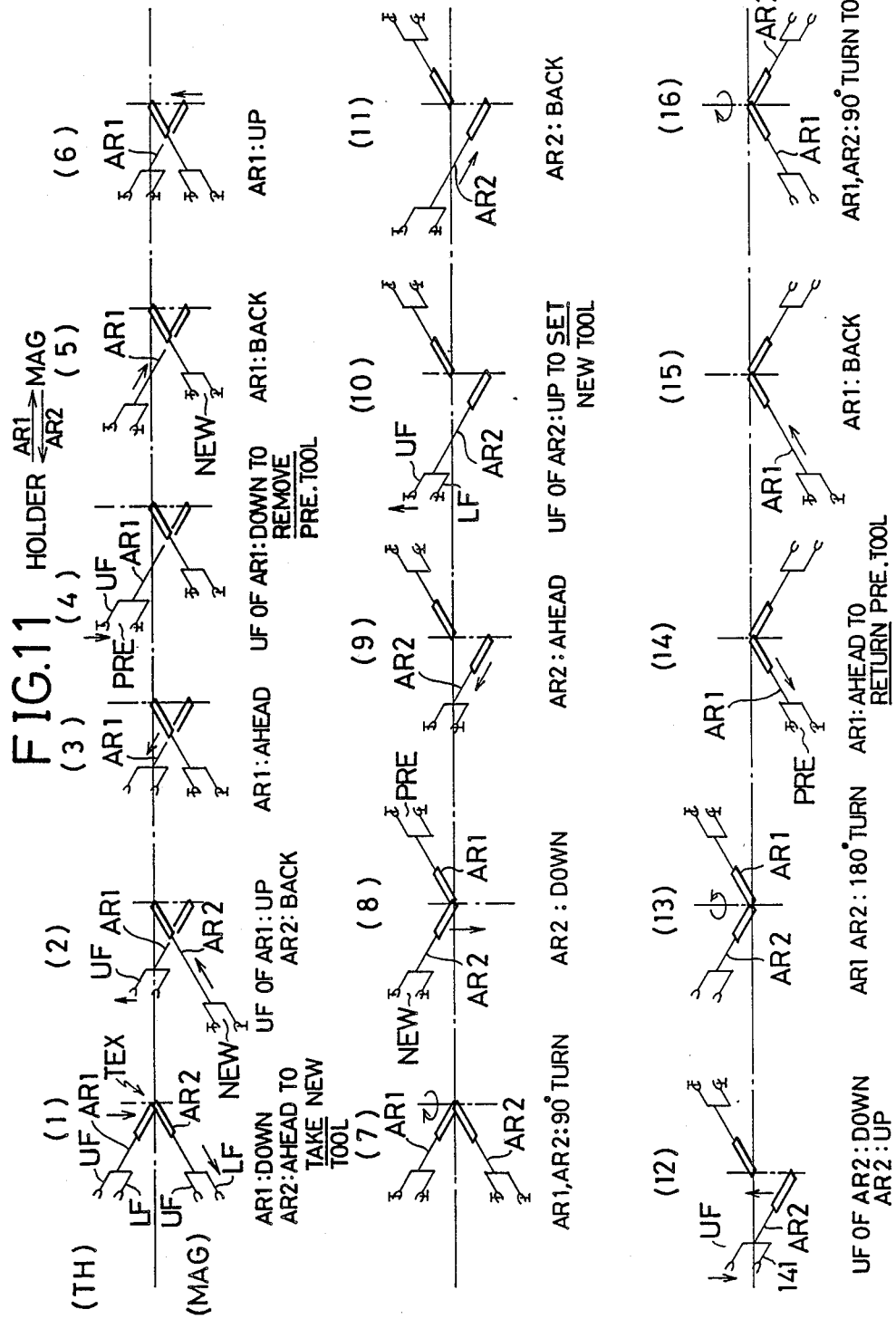

TOOL EXCHANGE APPARATUS

BACKGROUND OF THE INVENTION

1. Field of the Invention

The present invention relates to a tool exchange apparatus provided for a machine tool such as a punch press, for instance.

2. Description of the Prior Art

A machine tool is often provided with a tool exchange apparatus for automatically exchanging a number of tools to process a workpiece into various shapes or dimensions. In a punch press, for instance, a plurality of tools each composed of a punch and die set are arranged to punch a sheet-like workpiece into products of various shapes and dimensions.

In the case of a turret punch press, a number of punches are mounted on an upper turret and a number of dies are mounted on a lower turret, so that a set of a punch and die can be exchanged by pivoting the upper and lower turrets simultaneously in a relatively short time.

In the case of a punch press provided with a tool magazine and an automatic tool exchange apparatus, however, there exists a problem in that a relatively long time is required to exchange a set of a punch and die.

In more detail, the automatic tool exchange process is as follows: a previous tool (a pair of a punch and die) mounted on the press is removed by the automatic tool exchange apparatus; the removed previous tool is returned to a tool magazine; a new tool arranged on the tool magazine is indexed (while the exchange apparatus stands by); the indexed new tool is removed from the tool magazine and mounted on the press by the exchange apparatus. In other words, in the conventional tool exchange apparatus, since a previous tool is removed from the punch press and returned to the tool magazine and a new tool is removed from the tool magazine and mounted on the punch press by a single robot (arm) independently, when the tool magazine is being indexed, the tool exchange apparatus is at a standstill, thus resulting in a drawback such that the tool exchange time is relatively long.

Further, in the prior-art tool exchange apparatus, since a set of tools (punch and die) is exchanged simultaneously, when a new workpiece with a thickness different from that of a previous workpiece is punched into the same shape, both the same punch and die should be exchanged to change the clearance between the two. In other words, there exists a problem in that a number of tool sets (punch and die) with different clearances must be previously provided to punch workpieces of different thickness into the same shape of the same dimensions, thus resulting in wasteful tool arrangement.

SUMMARY OF THE PRESENT INVENTION

With these problems in mind, therefore, it is the primary object of the present invention to provide a tool exchange apparatus for a machine tool by which a tool can be exchange continuously and quickly without standstill.

It is another object of the present invention to provide a tool exchange apparatus for a machine tool by which even a single tool can be exchanged independently.

To achieve the above-mentioned object, a tool exchange apparatus for a machine tool according to the present invention comprises: (a) first tool exchange arm for removing a previous tool mounted on a tool holder of the machine tool and returning the removed previous tool to a tool magazine; (b) second tool exchange arm for removing a new tool arranged on the tool magazine and setting the removed new tool on the tool holder of the machine tool; and (c) said first and second tool exchange arms being arranged with an angular distance therebetween and actuated independently.

Each of said first and second tool exchange arms comprises: (a) upper finger means for clamping an upper tool; (b) lower finger means for clamping a lower tool; (c) vertical hydraulic cylinder means for moving said upper and lower finger means simultaneously in an axial direction of the tool; (d) horizontal hydraulic cylinder means for moving said upper and lower finger means simultaneously in a direction perpendicular to the tool axial direction; (e) hydraulic mini-cylinder means (M-CYL) for moving said upper finger means in the tool axial direction relative to the lower finger means.

Further, only a lower tool is removed by said lower finger means with said upper finger means kept at the lowest position away from the upper tool.

The above tool exchange apparatus is effected during the machining process of the machine tool at a higher speed. Further, only the lower tool can be exchanged quickly without exchanging the mated upper tool.

BRIEF DESCRIPTION OF THE DRAWINGS

The features and advantages of the tool exchange apparatus according to the present invention will be more clearly appreciated from the following description of the preferred embodiment of the invention taken in conjunction with the accompanying drawings in which like reference numerals designate the same or similar elements or parts throughout the figures thereof and in which:

FIG. 3 is an enlarged cross-sectional view showing a punch holder indicated by an arrow III in FIG. 1;

FIG. 3A is an enlarged perspective view of the punch lock device;

FIG. 4 is a bottom, partially cross-sectional view taken along the line IV—IV in FIG. 3;

FIG. 5 is an enlarged top view showing a tool exchange apparatus according to the present invention;

FIG. 6 is a side view of the tool exchange apparatus as seen from the line VI—VI in FIG. 2 or 5;

FIG. 11 is a series of illustrations for assistance in explaining the tool exchange process of the present invention.

DETAILED DESCRIPTION OF THE PREFERRED EMBODIMENTS

Prior to the description of the tool exchange apparatus of the present invention, a punch press taken as an example of machine tools will be described hereinbelow, to which the apparatus of the present invention is applied. However, without being limited to a punch press, it is of course possible to apply the tool exchange apparatus of the present invention to other machine tools.

Figure 1:
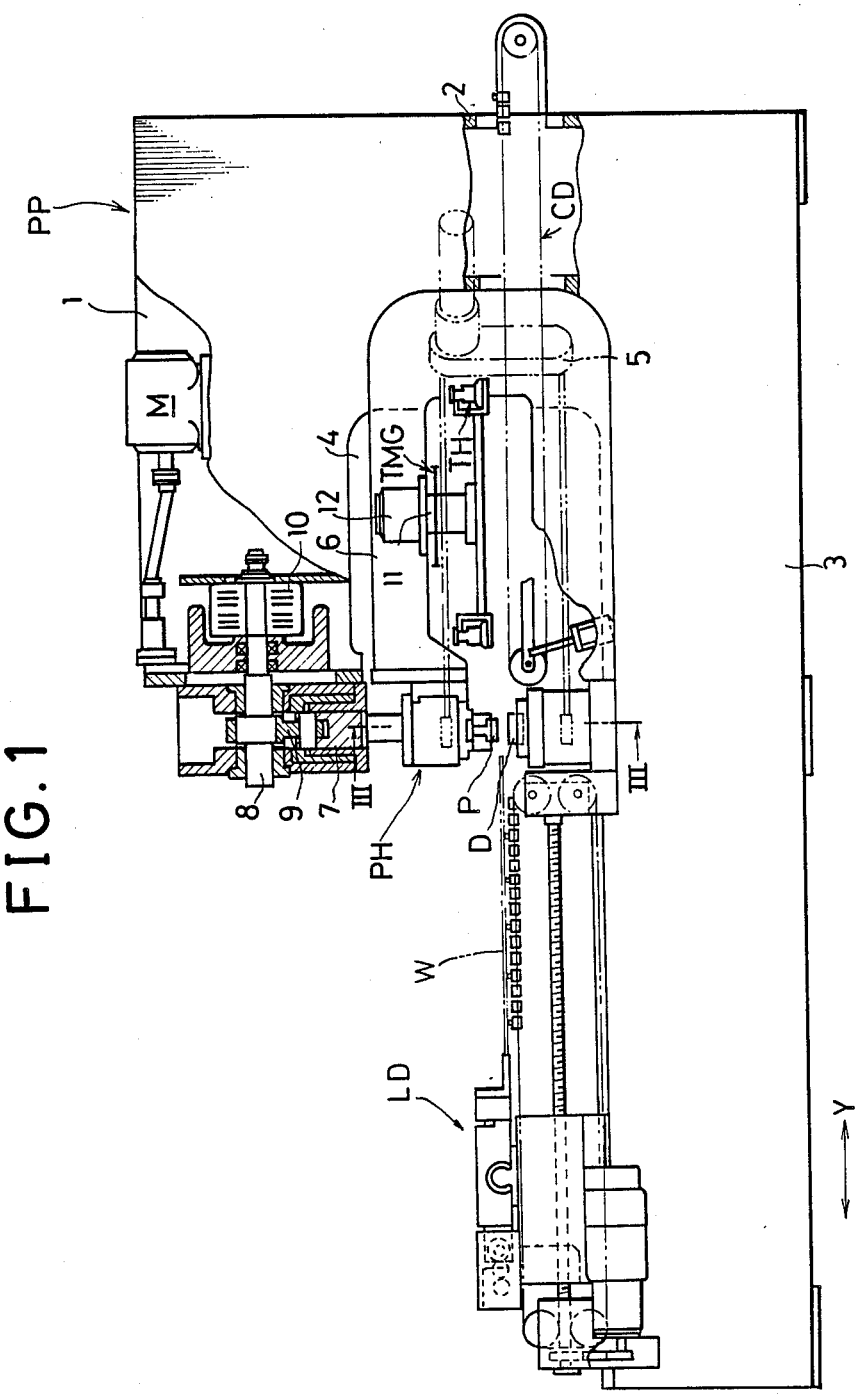
FIG. 1 is a side view showing a punch press to which an embodiment of the present invention is applied.
Figure 2:
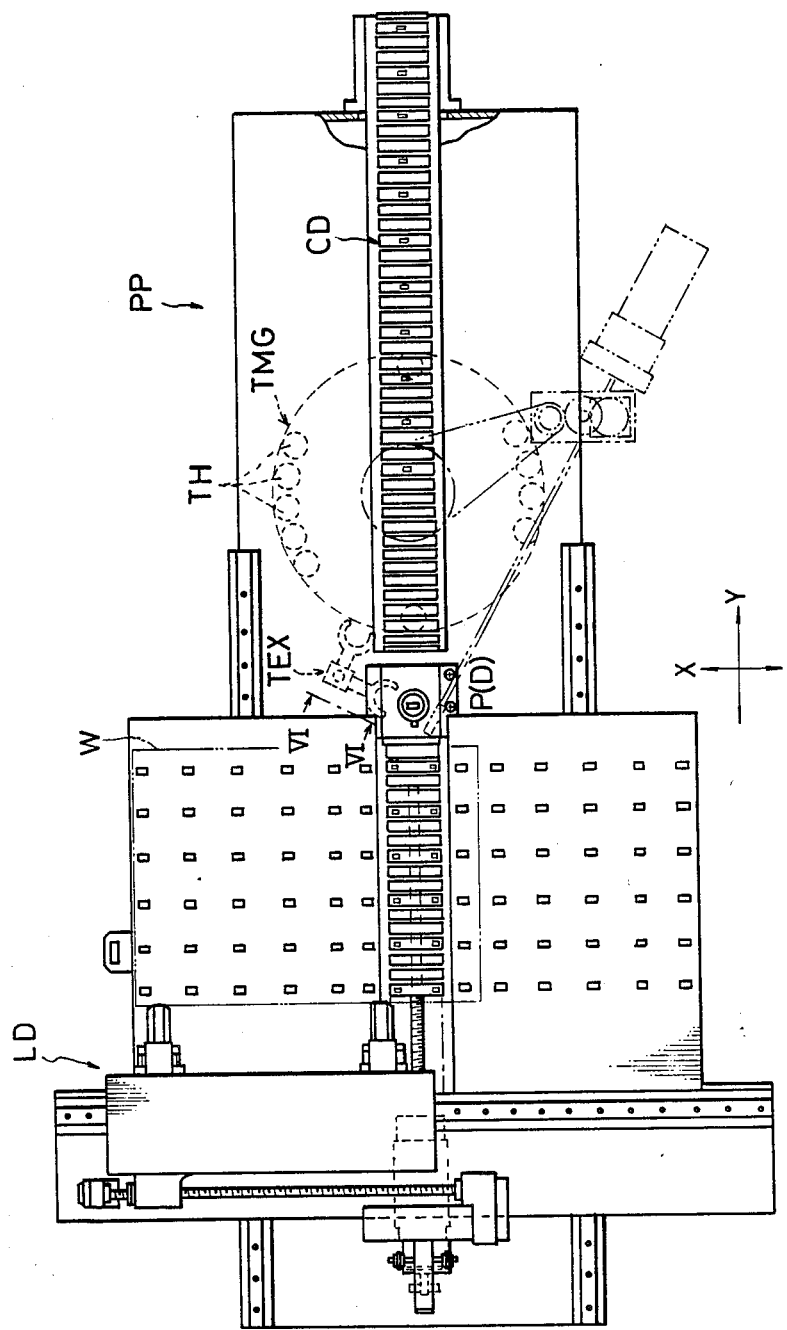
FIG. 2 is a top view of the same punch press.

FIG. 1 is a side view showing a punch press and FIG. 2 is a top view thereof. A punch press PP is constructed into a C-shaped frame such that an upper frame 1 is supported in cantilever fashion by a column section 2 vertically provided on the right side of a base frame 3. Within a throat portion 4 of the C-shaped frame, a sub-column section 5 is vertically provided in the vicinity of the column section 2. A beam member 6 extending along the upper frame 1 is supported by the sub-column section 5 also in cantilever fashion.

At the left end portion of the beam member 6, a punch holder PH for supporting a punch P is supported so as to be movable up and down and also rotatable. On the left side portion of the base frame 3, a die holder DH for supporting a die D mated with the punch P is rotatably arranged opposite the punch holder PH. To move the punch holder PH up and down, a ram 7 is supported at the left end of the frame 1 so as to be movable up and down. This ram 7 is appropriately linked with the punch holder PH and an eccentric portion of an eccentric shaft 8 rotatably supported at the end portion of the upper frame 1 via a connecting rod 9. Further, the eccentric shaft 8 is appropriately linked with a motor M mounted on the upper frame 1 via a clutch device 10. Therefore, when the motor M rotates, the ram 7 is moved up and down through the conventional mechanism, therefore the detailed description thereof being omitted herein.

In the above construction, the ram 7 is moved up and down when the motor M is driven, so that the punch holder PH is also moved up and down by the ram 7. Therefore, when a sheet-like workpiece W is sandwiched between the punch P and the die D, the workpiece W can be punched off, as is well understood.

To locate the workpiece, a workpiece locating device LD is arranged in front of the base frame 3 (on the leftmost side in FIGS. 1 and 2). This workpiece locating device LD locates a workpiece W at a predetermined processing position where the punch P and the die D are arranged by moving the workpiece W in both X- and Y-axis directions thereof in the same way as in a turret punch press, the detailed description thereof being omitted herein. Further, a conveyer device CD for carrying products punched by the punch P and the die D or scraps backward is provided for the base frame 3. The conveyer device CD is moved up and down a little near the die D by an appropriate driving mechanism (not shown).

Therefore, when a workpiece W is punched by the punch P and the die D while automatically locating the workpiece W in the X- and Y-directions by the workpiece locating device LD, products and scraps are automatically fed rearward on the conveyer device CD, as is well understood.

In order to set or remove the punch P and the die D to or from the punch holder DH and the die holder DH, a tool exchange apparatus TEX (shown in FIG. 2) is provided near the leftside portion of the beam member 6. Further, in order to accommodate a number of exchangeable tools (sets of punch P and die D), a disk-shaped tool magazine TMG is provided on the beam member 6. This tool magazine TMG is located over a pass line along which a workpiece W is fed and supported by a rotary shaft 11 rotatably arranged vertically by a bearing device 12 mounted on the beam member 6. On the above tool magazine TMG, a plurality of tool holders TH each for holding a set of punch P and die D or only a die D is arranged.

The tool magazine TMG is rotated by an appropriate motor (not shown) to index any desired tool holder TH to a predetermined tool exchange. When the tool holder TH has been indexed to a predetermined tool position, a tool (punch P and die D) is transferred between the tool exchange apparatus TEX and the tool magazine TMG.

Therefore, the punch P and the die D can be exchanged to or from the punch holder PH and the die holder DH by indexing any desired tool holder TH arranged on the tool magazine TMG to a predetermined tool position and by actuating the tool exchange apparatus TEX appropriately, as is well understood.

FIG. 3 is an enlarged view showing the punch holder PH. The punch holder PH is supported so as to be movable up and down and rotatable by a support housing 20 mounted at an end of the beam member 6. Within the support housing 20, a cylindrical ball spline housing 21 formed with a worm gear 22 at the outer circumference thereof and at the middle height thereof is rotatably supported by a number of bearings 23. Within this ball spline housing 21, the punch holder PH is supported via a number of balls so as to be movable up and down. The punch holder PH and ball spline housing 21 are coupled via balls in ball spline fashion so as to be rotatable together. Further, the worm gear 22 is in mesh with a worm 24 driven by a servomotor (not shown), so that the punch holder PH is rotated by the servomotor to punch holes identical in shape and size but different in direction.

To move the punch holder PH up and down, an upper end portion of the punch holder PH is linked to the ram 7. In more detail, a head member 25 provided with a flange portion 25F at top thereof is provided on the upper portion of the punch holder PH. Further, a connecting bracket 26 provided with a shear plate 27 is attached to the lower end of the ram 7 with a plurality of bolts. This connecting bracket 26 is formed with a T-shaped groove 26T so that the flange portion 25F of the head member 25 is removably mounted in the horizontal direction. Therefore, when the ram 7 is moved up and down, the punch holder PH is also moved up and down together therewith.

To automatically set or remove the punch P to or from the punch holder PH, a punch lock device PLD is provided at the lower portion of the punch holder PH. In more detail, a holder block 30 is fixedly attached to the lower end portion of the punch holder PH with plural bolts. This holder block 30 is formed with a lock hole 30H to receive a lock portion PFL projecting upward from the flange portion PF arranged on the upper portion of the punch P. As shown in FIG. 4 (a bottom view of the punch lock device PLD) in more detail, the lock hole 30H is formed in such a way that a part of a circular portion 30Ha is connected to a roughly triangular portion 30Hb formed so as to correspond in shape to a V-shaped projection side surfaces PFLa of the lock portion PFL of the punch P.

Within the circular portion 30Ha of the lock hole 30H, a rough-circular locking member 32 is fitted so as to be movable up and down. Within the locking member 32, a hook member 34 engageable with the lock portion PFL of the punch P is movably supported via a pin 35. The pin 35 is passed through a slot 32H vertically formed in the locking member 32 and fixedly supported by a holder block 30. Therefore, the locking member 32 is movable up and down relative to the hook member 34.

To receive the lock portion PFL of the punch P, the hook member 34 is formed at the lower end portion with a projection portion 34P engageable with a sideward projection portion PFLa formed at the upper end portion of the lock portion PFL and an inclined surface portion 34i formed opposite the projection portion 34P. Near the upper end portion of the hook member 34, another pin 35A is provided so as to project toward the same side as the inclined surface portion 34i. To pivot the hook member 34, an inclination surface 32i engageable with the inclined surface portion 34i of the hook member 34 is formed at the inner lower portion of the locking member 32, and a stepped portion 32s engageable with the pin 35A is formed at the upper portion of the locking member 32. Further, a cutout is formed in the locking member 32 at a position corresponding to the lock portion PFL of the punch P. On the upper end of the locking member 32, a T-shaped groove 32t is formed so as to be engageable with a lower end of a piston rod 36 of a hydraulic cylinder 37 for moving the locking member 32 up and down.

The hydraulic cylinder 37 is provided for the punch holder PH, and a flange ortion is formed at the lower end of the piston rod 36 so as to be engaged with the T-shaped groove 32T of the locking member 32. The hydraulic cylinder 37 is operated by a working fluid charged or discharged via fluid paths 38 formed in the punch holder PH and communicating with a rotary joint member 39 rotatably attached to the head member 25. This rotary joint member 39 is stopped from rotating when a restriction member 40 is engaged with a stopper 41 fixed to the connecting bracket 26.

In the above construction, when a working fluid is supplied to the hydraulic cylinder 37 via the rotary joint member 39 and the fluid paths 38 to lower the locking ymember 32, the inclination surface 32i of the locking member 32 is brought into contact witn the inclination surface portion 34i of the hook member 34, so that the hook member 34 is pivoted counterclockwise in FIG. 3. Therefore, the projection portion 34P of the hook member 34 urges the lock portion PFL of the punch P toward the V-shaped portion 30Hb of the lock hole 30H and simultaneously the projection portion PFLa of the lock portion PFL in the upward direction, so that the punch P is fixed to the holder block 30 in such a way that the upper surface of the punch flange portion PF is brought into contact with the lower end surface of the holder block 30. Further, a reactive force generated when the hook member 34 is fixed to the lock portion PFL of the punch P or a component force applied to the punch P in nibbling is received by a holder block 30. Therefore, it is unnecessary to construct the locking member 32 in a rigid way, thus realizing a relatively compact construction.

In contrast, when the piston rod 36 of the hydraulic cylinder 37 is actuated in the upward direction, the stepped portion 32s of the locking member 32 is brought into contact with the pin 35 to pivot the hook member 34 clockwise in FIG. 3, so that the punch P is released from a fixed condition, thus the punch P being removable toward the downward direction as is well understood.

With reference to FIGS. 3 and 4, a stripper holder SH for supporting a stripper ST which surrounds the punch P is provided for the holder block 30. The stripper holder SH is formed in such a way that a part of the annular portion thereof is cut open to allow the stripper ST to be movable. This stripper holder SH is formed with a circular arc-shaped support portion SHa engageable with a circumferential groove STg formed in the circumferential surface of the stripper ST. Further, the stripper holder SH is provided with a number of ball snaps 52 to support the stripper ST. The stripper holder SH is supported by a plurality of support pins 53 supported by the holder block 30 so as to be movable up and down, and elastic members 54 such as coil spring are provided between the stripper holder SH and the holder block 30.

Therefore, in punching operation of the workpiece W by the punch P, the workpiece W is pushed by the stripper ST to allow the punch P to be extracted reliably from the workpiece W.

The die D is set or removed to or from the die holder DH by moving the die D horizontally relative to the die holder DH. Further, the die D is fixed to the die holder DH in the conventional way, so that a detailed description thereof is omitted herein.

In view of the above description, reference is now made to a tool exchange apparatus TEX according to the present invention.

With reference to FIG. 5, the tool exchange apparatus TEX is provided with a first tool exchange arm AR1 and a second tool exchange arm AR2. The first tool exchange arm AR1 serves to remove the punch P, the die D and the stripper SH from the punch holder PH and the die holder DH and to arrange these into the tool holder TH of the tool magazine TMG. The second tool exchange arm AR2 serves to remove the punch P, the die D and the stripper SH arranged in the tool holder TH of the tool magazine TMA and to set these onto the punch holder PH, the die holder DH and the stripper holder SH.

As shown in FIG. 5, the first and second tool exchange arms AR1 and AR2 are arranged a 90 degree angular distance apart from each other and actuated independently.

Since the first and second tool exchange arms AR1 and AR2 are arranged in symmetrical relationship to each other, only the first tool exchange arm AR1 is described herein below. With respect to the second tool exchange arm AR2, the description thereof is omitted herein by retaining the same reference numerals for similar elements which have the same function as in the first tool exchange arm AR1.

With reference to FIG. 6, under the bracket 101 mounted on the beam member 6 (shown in FIG. 1), a pivotal shaft 105 is rotatably supported via a bearing device 103. This pivotal shaft 105 is pivoted by an appropriate driving device (not shown) 90 or 180 degrees in the forward or reverse direction.

Figure 7:
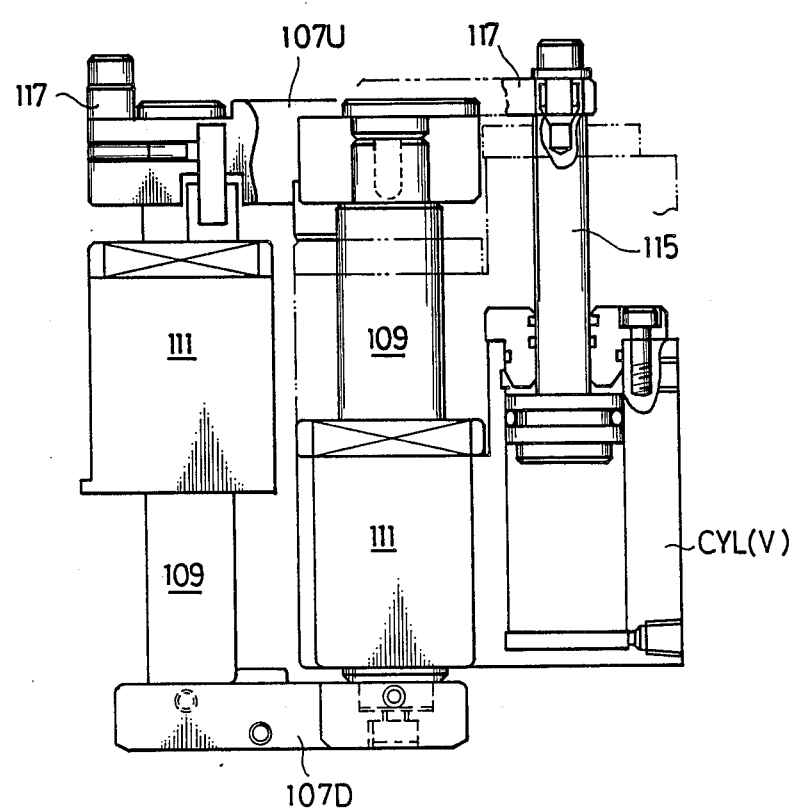
FIG. 7 is a cross-sectional view taken along the lines VII—VII in FIG. 5.

With reference to FIGS. 5 to 7, on the upper and lower portions of the pivotal shaft 105, upper and lower L-shaped support brackets 107U and 107D are fixed at the middle thereof by a key, respectively. On one side of the upper and lower support brackets 107U and 107D, a guide bar 109 is vertically supported to guide the first tool exchange arm AR1 in the up-and-down direction. On the other side of the upper and lower support brackets 107U and 107D, another guide bar 109 is vertically supported to guide the second tool exchange arm AR2 in the up-and-down direction.

To move the first tool exchange arm AR1 up and down between positions of the punch (P) and die (D) at the tool holders (PH and DH) and between positions of the punch (P) and die (D) at the tool magazine (TMG), a lift block 111 is supported by the guide bar 109 so as to be movable up and down. An upper end portion of the piston rod 115 extending upward from a vertical hydraulic cylinder CYL(V) fixed to this lift block 111 is linked to a link bracket 117 fixed to the upper support bracket 107U. Therefore, when a working fluid is supplied to the vertical hydraulic cylinder CYL(V), the lift block 111 moves up and down along the guide bar 109.

To reciprocably move the first tool exchange arm AR1 in the horizontal direction, a rail support plate 119 extending horizontally is fixed to the lift block 111, and a guide rail 121 is mounted horizontally on this rail support plate 119. A slide block 123 is reciprocably supported by this guide rail 121, and a connection plate 125 is fixed to this slide block 123. Further, a horizontal hydraulic cylinder CYL(H) is supported by the rail support plate 119 via a T-shaped support bracket 127. An end of the piston rod 131 of the horizontal hydraulic cylinder CYL(H) is linked with the connection plate 125 via an appropriately-bent connection member 133

Therefore, when the horizontal hydraulic cylinder CYL(H) is actuated, the connection plate 125 is moved to and fro along the guide rail 121.

To the connection plate 125, a base portion of an arm plate 135 extending across the guide rail 121 is fixed at the lower position thereof.

Figure 8:
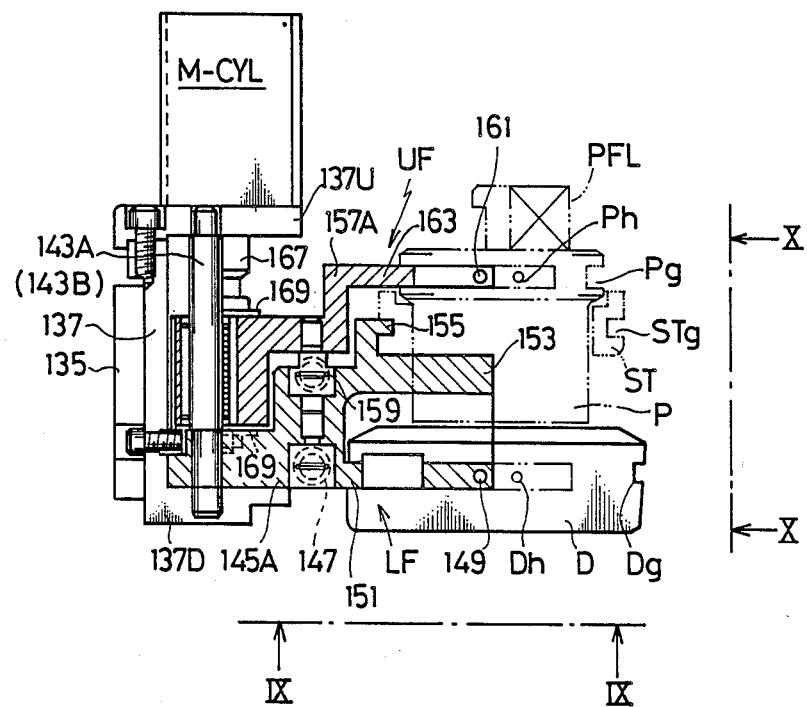
FIG. 8 is a cross-sectional view taken along the line VIII—VIII in FIG. 5.

On the end portion of this arm plate 135, as shown in FIG. 8, a roughly C-shaped arm bracket 137 provided with an upper plate 137U and a lower plate 137D are fixed in opposing positional relationship to each other. An upper finger UF for clamping the punch P and a lower finger LF for clamping the die D are supported by this arm bracket 137.

Therefore, when the horizontal hydraulic cylinder CYL(H) is actuated to move the upper and lower fingers UF and LF to and fro, the punch P and the die D are removably mounted onto the punch holder PH and the die holder DH.

The operation of the upper UF or lower finger, LF will be described hereinbelow.

Figure 10:
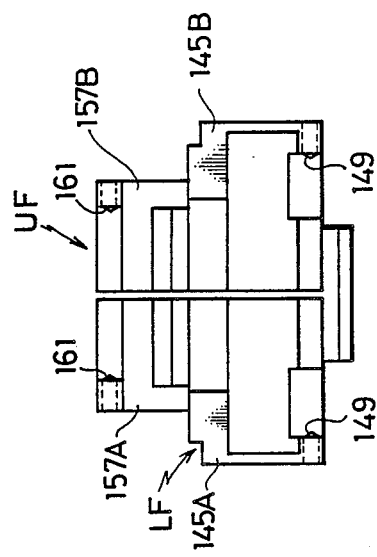
FIG. 10 is a side view showing upper and lower fingers as seen from the line X—X in FIG. 8.
Figure 9:
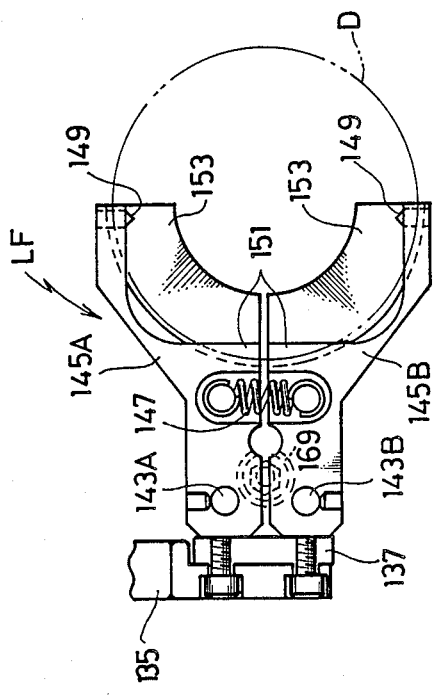
FIG. 9 is a bottom view showing a lower finger as seen from the line IX—IX in FIG. 8.

With reference to FIGS. 8 to 10, two pivotal shafts 143A and 143B are provided vertically at an appropriate interval between the upper and lower plates 137U and 137D of the arm bracket 137. A base portion of one die clamping member 145A of the lower finger LF is pivotally supported at the lower portion of one pivotal shaft 143A, and that of the other die clamping member 145B is pivotally supported at the lower portion of the other pivotal shaft 143B.

A pair of the die clamping members 145A and the 145B are formed symmetrical with respect to each other, and urged toward the direction that the two members are closed by a coil spring 147 provided between the two.

Each die clamping member 145A or 145B is provided at an end thereof with a lock pin 149 engageable with one of lock holes Dh formed on the side surface of the die D at intervals and with a lock projection portion 151 engageable with a groove portion Dg formed on the circumferential surface of the die D. In addition, each die clamping member 145A or 145B is formed with a stripper support portion 153 for supporting the stripper ST and with an engagement projection portion 155 engageable with a circumferential groove STg of the stripper ST.

Under this construction, when the die D is inserted into between the two die clamping members 145A and 145B the die D can be clamped between the two die clamping members 145A and 145B on the basis of the functions of the coil spring 147, the lock pin 149 and the lock projection portion 151. Further, when the die D is pulled from between the two die clamping members 145A and 145B, the die D can be removed easily. Furthermore, it will be understood that the stripper ST is removably supported by the two die clamping members 145A and 145B.

With reference to FIGS. 8 and 10 again, the upper finger UF is made up of a pair of symmetrical punch clamping members 157A and 157B, and each base portion thereof is pivotally supported by each pivotal shaft 143A or 143B so as to be movable up and down. These two punch clamping members 157A and 157B are urged in such a direction as to be closed by a coil spring 159 provided therebetween. Further, each punch clamping member 157A or 157B is provided at one end thereof with a lock pin 161 engageable with one of lock holes Ph formed in the side surface of the flange portion PF of the punch at an interval and with a lock projection portion 163 engageable with a groove portion Pg formed in the flange portion PF of the punch P.

Under the above construction, the punch P can be clamped between two punch clamping members 157A and 157B in the same way as when the die D is clamped between two die clamping members 145A and 145B.

As described in more detail later, the die D can be set to the punch press by simply moving ahead the second tool exchange arm AR2 in the horizontal direction. However, the punch holder PH can be set thereto by further moving the second arm AR2 in the upward direction with a mini-cylinder M-CYL.

The minicylinder M-CYL is mounted on the upper plate 137U of the arm bracket 137 in order to move the punch clamping members 157A and 157B up and down, that is, to engage or disengage the lock portion PFL of the punch P with or from the lack hole 30H of the holder block 30 arranged at the lower portion of the punch holder PH. A piston rod 167 of the minicylinder M-CYL is located between the two punch clamping members 157A and 157B. A sufficiently large washer 169 is provided on both the surfaces where the piston rod 167 correspond to the upper and lower surfaces of the two punch clamping members 157A and 157B in such a way as not to be dislocated from these members even when the two members 157A and 157B are opened.

Under the above construction, when the minicylinder M-CYL is actuated, both the punch clamping members 157A and 157B are moved up and down being guided along the pivotal shaft 143A and 143B.

As already understood, the first tool exchange arm AR1 is moved to and fro in the horizontal direction, and further the upper finger UF of the first tool exchange arm AR1 is moved up and down relative to the lower finger LF. Further, the second tool exchange arm AR2 is actuated in the same way as the first tool exchange arm AR1. Furthermore, when the pivotal shaft 105 is pivoted, the first and second tool exchange arms AR1 and AR2 are pivoted horizontally at the same time.

FIG. 11 shows a sequence of tool exchange steps, each of which illustrates each operation of the tool exchange apparatus TEX. Here, the first tool exchange arm AR1 removes a tool on the tool holder (TH) and returns it to the tool magazine (MAG), while the second tool exchange arm AR2 removes a tool on the magazine (MAG) and sets it to the tool holder (TH).

Further, the punch P (upper tool) can be removed from the punch holder PH by lowering the punch P and set to the punch holder PH by raising te punch P. However, the punch P can be removed from the tool magazine MAG and returned thereto by simply moving the punch P in the horizontal direction. On the other hand, the die D (lower tool) can be removed or set to the die holder DH and the tool magazine MAG by simply moving the die D in the horizontal direction.

In FIG. 11, step (1) shows the state where the first and second tool exchange arms AR1 and AR2 clamp no tool (the punch P and die D). In step (1), the first tool exchange arm AR1 comes down to a height of a previous tool mounted on the tool holder (TH). Further, second tool exchange arm AR2 goes ahead to remove a new tool mounted on the tool magazine (MAG), proceeding to step (2).

In the step (2), the upper finger UF of the first tool exchange arm AR1 goes up to a height of the upper tool mounted on the tool holder. The second tool exchange arm AR2 removes a new tool from the tool magazine (MAG) and comes back, proceeding to step (3).

In the step (3), the first tool exchange arm AR1 goes ahead to remove a previous tool mounted on the tool holder. The second tool exchange arm AR2 stands by, proceeding to step (4).

In the step (4), the upper finger UF of the first tool exchange arm AR1 comes down to lower the tool, after the tool mounted on the tool holder has been removed. The second tool exchange arm AR2 stands by, proceeding to step (5).

In the step (5), the first tool exchange arm AR1 goes back to remove the tool. The second tool exchange arm AR2 stands by, proceeding to step (6).

In the step (6), the first tool exchange arm AR1 goes up to the original height prior to pivotal motion. The second tool exchange arm AR2 stands by, proceeding to step (7).

In the step (7), the two arms AR1 and AR2 pivot 90 degrees so that the second tool exchange arm AR2 is located at the tool mounting portion of the punch press, proceeding to step (8).

In the step (8), the second tool exchange arm AR2 goes down to the height of the tool mounting portion of the punch press, the first tool exchange arm AR1 stands by, proceeding to step (9).

In the step (9), the second tool exchange arm AR2 goes ahead to mount the new tool onto the tool mounting portion of the punch press. The first tool exchange arm AR1 stands by, proceeding to step (10).

In the step (10), the upper finger UF of the second tool exchange arm AR2 goes up to set the new tool. The first tool exchange arm AR1 stands by, proceeding to step (11).

In the step (11), after the new tool has been fixed, the second tool exchange arm AR2 goes back. The first tool exchange arm AR1 stands by, proceeding to step (12). Therefore, punching processing starts by use of the newly-set tool.

In the step (12), the second tool exchange arm AR2 goes up to the original height and the upper finger UF comes down. The first tool exchange arm AR1 stands by, proceeding to step (13).

In the step (13), the first and second tool exchange arms AR1 and AR2 pivot 180 degrees in the reverse direction. The first tool exchange arm AR1 is located at the tool magazine, proceeding to step (14).

In the step (14), the first tool exchange arm AR1 goes ahead to return the previous tool to the tool holder of the tool magazine. The second tool exchange arm AR2 stands by, proceeding to step (15).

In the step (15), the first tool exchange arm AR1 comes back to the original position, the second tool exchange arm AR2 stands by, proceeding to step (16).

In the step (16), the first and second tool exchange arms AR1 and AR2 pivot 90 degrees in the arrow direction, returning to the origin step (1).

As understood by the above description, the first tool exchange arm AR1 functions to remove the tool set on the punch press and return it to the tool magazine. The second tool exchange arm AR2 functions to remove the tool arranged in the tool magazine and set it to the tool holder of the punch press. Therefore, it is possible to shorten tool exchange time markedly, because the tool exchange operation can be effected continuously. Further, since the upper finger UF of the first or second tool exchange arm can be moved up and down, when the upper finger UF is kept lowered at the lowest position away from the upper tool, it is possible to exchange only the lower tool by use of only the lower finger LF. In other words, where the punching dimensions and shapes are the same but only the workpiece thickness changes, this function is useful for clearance adjustment between the punch and the die.

As understood by the above description of the embodiment, in the present invention, since the tool accommodation to the tool magazine and the tool removal from the tool magazine can be effected simultaneously during processing work of the machine tool, it is possible to quickly exchange tools, thus improving the workpiece processing efficiency.

What is claimed is:

1. A tool exchange apparatus for a machine tool, which comprises:
    (a) first tool exchange arm (AR1) for removing a previous tool mounted on a tool holder of the machine tool and returning the removed previous tool to a tool magazine (MAG);
    (b) second tool exchange arm (AR2) for removing a new tool arranged on the tool magazine and setting the removed new tool on the tool holder of the machine tool; and
    (c) said first and second tool exchange arms being arranged with an angular orientation so as to be disposed with a predetermined angular orientation with respect to one another and actuated separately by hydraulic pressure, each tool exchange arm including:
        (1) upper finger means (UF) for clamping an upper tool (P);
        (2) lower finger means (LF) for clamping a lower tool (D);
        (3) vertical hydraulic cylinder means (CYL-V) for moving said upper and lower finger means simultaneously in an axial direction of the tool (P, D);
        (4) horizontal hydraulic cylinder means (CYL-H) for moving said upper and lower finger means simultaneously in a direction perpendicular to the tool axial direction; and (5) hydraulic cylinder means (M-CYL) for moving said upper finger means in the axial direction of the tool relative to said lower finger means.

2. The tool exchange apparatus as set forth in claim 1, wherein said lower finger means is further provided with means for removing only a lower tool with said upper finger means kept at the lowest position by said hydraulic cylinder means.

3. The tool exchange apparatus as set forth in claim 2, wherein said lower finger means comprises a stripper supporting member (153) for supporting a stripper (ST) attached to the upper tool (P).

4. A method of exchanging a previous tool mounted on a machine tool with a new tool arranged on a tool magazine, which comprises the following steps of:
   (a) clamping a previous tool mounted on a machine tool by actuating a first tool exchange arm (AR1) to remove the previous tool from the machine tool, by the steps of:
      (1) lowering the first tool exchange arm (AR1);
      (2) raising an upper finger (UF) attached to the first tool exchange arm;
      (3) extending the first tool exchange arm to a tool setting position in order to clamp a previous tool;
      (4) lowering the upper finger;
      (5) shortening the extended first tool exchange arm to the original length; and
      (6) raising the first tool exchange arm to the original position;
   (b) clamping a new tool arranged on a tool magazine by actuating a second tool exchange arm (AR2) to set the new tool to the machine tool;
   (c) pivoting the first and second tool exchange arms simultaneously so that the second tool exchange arm is located at a tool setting position;
   (d) setting the clamped new tool on the machine tool by the steps of:
      (1) lowering the second tool exchange arm (AR2);
      (2) extending the second tool exchange arm to a tool setting position;
      (3) raising an upper finger (UF) attached to the second tool exchange arm in order to set a new tool;
      (4) shortening the extended second tool exchange arm to the original length;
      (5) lowering the upper finger to the original position; and
      (6) raising the second tool exchange arm to the original height,
   (e) pivoting the fist and second tool exchange arms simultaneously so that the first tool exchange arm is located at a tool returning position;
   (f) returning the clamped previous tool to the tool magazine; and
   (g) pivoting the first and second tool exchange arms simultaneously to the original position 5. A tool exchange apparatus, which comprises:
   (a) a first tool exchange arm;
   (b) a second tool exchange arm; and
   (c) each of said first and second tool exchange arms including:
      (1) upper finger means (UF) for clamping an upper tool (P);
      (2) lower finger means (LF) for clamping a lower tool (D);
      (3) vertical hydraulic cylinder means (CYL-V) for moving said upper and lower finger means simultaneously in an axial direction of the tool (P, D);
      (4) horizontal hydraulic cylinder means (CYL-H) for moving said upper and lower finger means simultaneously in a direction perpendicular to the tool axial direction; and
      (5) hydraulic cylinder means (M-CYL) for moving said upper finger means in the axial direction of the tool relative to said lower finger means.

* * * * *